US011919636B2

(12) United States Patent
Clark et al.

(10) Patent No.: US 11,919,636 B2
(45) Date of Patent: Mar. 5, 2024

(54) WIRELESSLY CONTROLLED FLYING AND SUBMERGING VEHICLE

(71) Applicant: SeaHawk Robotics Inc., Vancouver (CA)

(72) Inventors: Jason Clark, Port Moody (CA); Derek Puzzuoli, Vancouver (CA); Steven Peddlesden, Sidney (CA)

(73) Assignee: SeaHawk Robotics Inc., Vancouver (CA)

( * ) Notice: Subject to any disclaimer, the term of this patent is extended or adjusted under 35 U.S.C. 154(b) by 532 days.

(21) Appl. No.: 16/972,446

(22) PCT Filed: May 30, 2019

(86) PCT No.: PCT/CA2019/050746
§ 371 (c)(1),
(2) Date: Dec. 4, 2020

(87) PCT Pub. No.: WO2019/232617
PCT Pub. Date: Dec. 12, 2019

(65) Prior Publication Data
US 2021/0261248 A1    Aug. 26, 2021

Related U.S. Application Data

(60) Provisional application No. 62/680,876, filed on Jun. 5, 2018.

(51) Int. Cl.
*B64C 37/00*    (2006.01)
*B63B 35/00*    (2020.01)
(Continued)

(52) U.S. Cl.
CPC ............ *B64C 39/024* (2013.01); *B63B 35/00* (2013.01); *B63G 8/001* (2013.01); *B64C 37/00* (2013.01); *G05D 1/0038* (2013.01); *H04B 3/06* (2013.01); *H04W 4/40* (2018.02); *B63G 2008/007* (2013.01); *B64U 50/00* (2023.01); *B64U 2201/202* (2023.01)

(58) Field of Classification Search
CPC ........ B64C 39/024; B64C 37/00; H04W 4/40; B63B 35/00; B63G 8/001; B63G 2008/007; G05D 1/0038; H04B 3/60; B64U 2201/202; B64U 50/00
See application file for complete search history.

(56) References Cited

U.S. PATENT DOCUMENTS 9,010,678 B1    4/2015    Hiller
2015/0246713 A1    9/2015    Askew et al.
(Continued)

FOREIGN PATENT DOCUMENTS

FR    2937306 B1    8/2011

OTHER PUBLICATIONS

International Search Report and Written Opinion in related PCT application No. PCT/CA2019/050746 dated Jul. 24, 2019, 8 pages.
(Continued)

*Primary Examiner* — Mathew Franklin Gordon
(74) *Attorney, Agent, or Firm* — Zeman-Mullen & Ford, LLP

(57) ABSTRACT

The present invention discloses a wirelessly controlled vehicle that is configured to travel in air, on liquid and under liquid with an ability to communicate with a remote operator through wireless communication.

14 Claims, 5 Drawing Sheets

(51) Int. Cl.
*B63G 8/00* (2006.01)
*B64C 39/02* (2023.01)
*G05D 1/00* (2006.01)
*H04B 3/06* (2006.01)
*H04W 4/40* (2018.01)
*B64U 50/00* (2023.01)

(56) References Cited

U.S. PATENT DOCUMENTS

2017/0267345 A1 9/2017 Marom
2018/0107210 A1 4/2018 Harnett et al.

OTHER PUBLICATIONS

Release the Cracuns: Apl develops drone that can operate in the air or underwater, Johns Hopkins University, Mar. 31, 2016; downloaded on Oct. 13, 2023 from: https://hub.jhu.edu/2016/03/31/cracuns-underwater-air-drone-apl/.

Water and Air: Flying Fish UAAV Can Go Anywhere, Johns Hopkins University, Sep. 6, 2017; downloaded on Oct. 13, 2023 from: https://www.jhuapl.edu/news/news-releases/170906-water-and-air-flying-fish-uaav-can-go-anywhere.

Marco Margaritoff, The EagleRay XAV Amphibious Drone Can Dive and Fly, Feb. 15, 2018; downloaded on Oct. 13, 2023 from: https://www.thedrive.com/tech/18512/the-eagleray-xav-amphibious-drone-can-dive-and-fly.

No end to the usefulness of Rutgers flying/diving drone, Rutgers University, Jul. 2017; downloaded on Oct. 13, 2023 from: https://cait.rutgers.edu/rutgers-naviator-uas-conducts-first-combination-aerial-and-underwater-bridge-inspection/.

OU team's Loon Copter wins $1M prize in international Drones for Good, Oakland University, Jan. 28, 2016; downloaded from: https://oakland.edu/secs/news/2016/winter/ou-teams-underwater-drone-competing-for-1m-prize-in-international- competition.

Boeing Applies for "Rapid Deployment Air and Water Vehicle" UAV Patent, Boeing, Sep. 13, 2015; downloaded on Oct. 13, 2023 from: https://www.droneuniversities.com/drones/boeing-applies-for-rapid-deployment-air-and-water-vehicle-uav-patent/.

Innocorp, LLC Announces SubMurres—It Swims and Flies, SubMurres, Feb. 3, 2017; downloaded from: https://dronelife.com/2017/02/03/innocorp-llc-announces-submurres-swims-flies/.

WIRELESSLY CONTROLLED FLYING AND SUBMERGING VEHICLE

CROSS-REFERENCE TO RELATED APPLICATIONS

This application claims the benefit of priority from U.S. Provisional Patent Application Ser. No. 62/680,876 filed on Jun. 5, 2018 and entitled "WIRELESSLY CONTROLLED FLYING AND SUBMERGING VEHICLE", the contents of which are incorporated by reference.

FIELD OF THE INVENTION

The present invention pertains to aerial and marine vehicles and particularly relates to a remotely operated vehicle configured to travel and wirelessly communicate during flight and submerged travel.

BACKGROUND

There have been several types of unmanned vehicles configured to explore and accomplish various tasks and missions without physical presence of human operator in areas that cannot be easily accessed by human beings. Some of these vehicles are autonomously operated. These types of unmanned vehicles do not require a human operator as the vehicle can be operated only based on pre-programmed itineraries. A human operator may be able to interrupt the pre-programmed operation of the vehicle in certain conditions. For this, the human operator may have to communicate with a control system of the vehicle via a tether connected to a control system of the vehicle body.

Another type of unmanned vehicles is remotely operated vehicles (ROVs). ROVs may be remotely controlled by a human operator who is not present in the vehicle. To enable remote operation, because of limitations on wireless communication through water, ROVs require a tether connected to a control surface body to operate, communicate with, or supply power to the vehicle through water. The tether is usually connected at the surface to a control unit or power unit installed on one of deployment facilities such as dive support vessel (DSV), dock, shore, platform or floating production storage and offloading (FPSO) unit.

However, these deployments all have at least some shortcomings. For example, a DSV, the most common type of deployment facility for remote or offshore operation of the ROVs, may be able to facilitate operation of only a limited type of ROVs depending on the ROV's size and/or the DSV's specification. Another DSV may restrict a ROV traveling to a certain region (e.g. narrow strait) due to its size. Even if the area is accessible by a DSV, it may be time and cost restrictive to mobilize the DSV. Furthermore, lack of ability to wirelessly communicate with the ROV during the vehicle's submerged travel, due to limitations on wireless communication through liquid, also limits operation of the vehicle further.

Similar restrictions may apply for ROV operation from other type of deployment facilities. Also, while a dock or shore may be facilitated to operate the ROVs especially near the dock or shore, due to the close proximity the operation of ROVs may be exposed to higher risks of entanglement with infrastructures or vegetation.

Thus, it is desired to have ROVs that can be operated without one or more of the restrictions in the prior art. In addition, it is further desired that ROVs can travel in a plurality of media (e.g. a ROV with an ability to travel both in air and under water) in order to extend areas that can be accessed and explored by the ROV.

Therefore there is a need for a novel remotely operated unmanned vehicle configured to travel and communicate in air, on liquid and under liquid that is not subject to one or more limitations or shortcomings of the prior art discussed above.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a wirelessly controlled flying and submerging vehicle. In accordance with an aspect of the present invention, there is provided a wirelessly controlled vehicle configured for air travel and submerged travel. The vehicle includes a submerging body and a surface body configured to be coupled to the submerging body during air travel and decoupled from the submerging body during submerged travel, the surface body configured to at least in part float during submerged travel and the surface body configured to wirelessly receive operational instructions during submerged travel. The vehicle further includes an air propulsion system operatively coupled to one or more of the submerging body and the surface body and a liquid propulsion system operatively coupled to the submerging body. In addition, the vehicle includes a tether communicatively connecting the submerging body and the surface body, the tether configured to transfer data indicative of the operational instructions between the submerging body and the surface body.

In accordance with another aspect of the present invention, there is provided a wirelessly controlled vehicle configured for air travel and submerged travel. The vehicle includes a submerging body and a surface body configured to be coupled to the submerging body during air travel and decoupled from the submerging body during submerged travel, the surface body configured to at least in part float during submerged travel and the surface body configured to wirelessly receive operational instructions during submerged travel. The vehicle further includes a propulsion system operatively coupled to the submerging body and a tether communicatively connecting the submerging body and the surface body, the tether configured to transfer data indicative of the operational instructions between the submerging body and the surface body.

In accordance with another aspect of the present invention there is provided wirelessly controlled vehicle configured for air travel and submerged travel. The vehicle includes a submerging body and a surface body configured to be coupled to the submerging body during air travel and decoupled from the submerging body during submerged travel, the surface body configured to at least in part float during submerged travel and the surface body configured to wirelessly receive operational instructions during submerged travel. The vehicle further includes a propulsion system operatively coupled to the submerging body and the surface body and a communication system communicatively connecting the submerging body and the surface body, the communication system configured to transfer data indicative of the operational instructions between the submerging body and the surface body.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
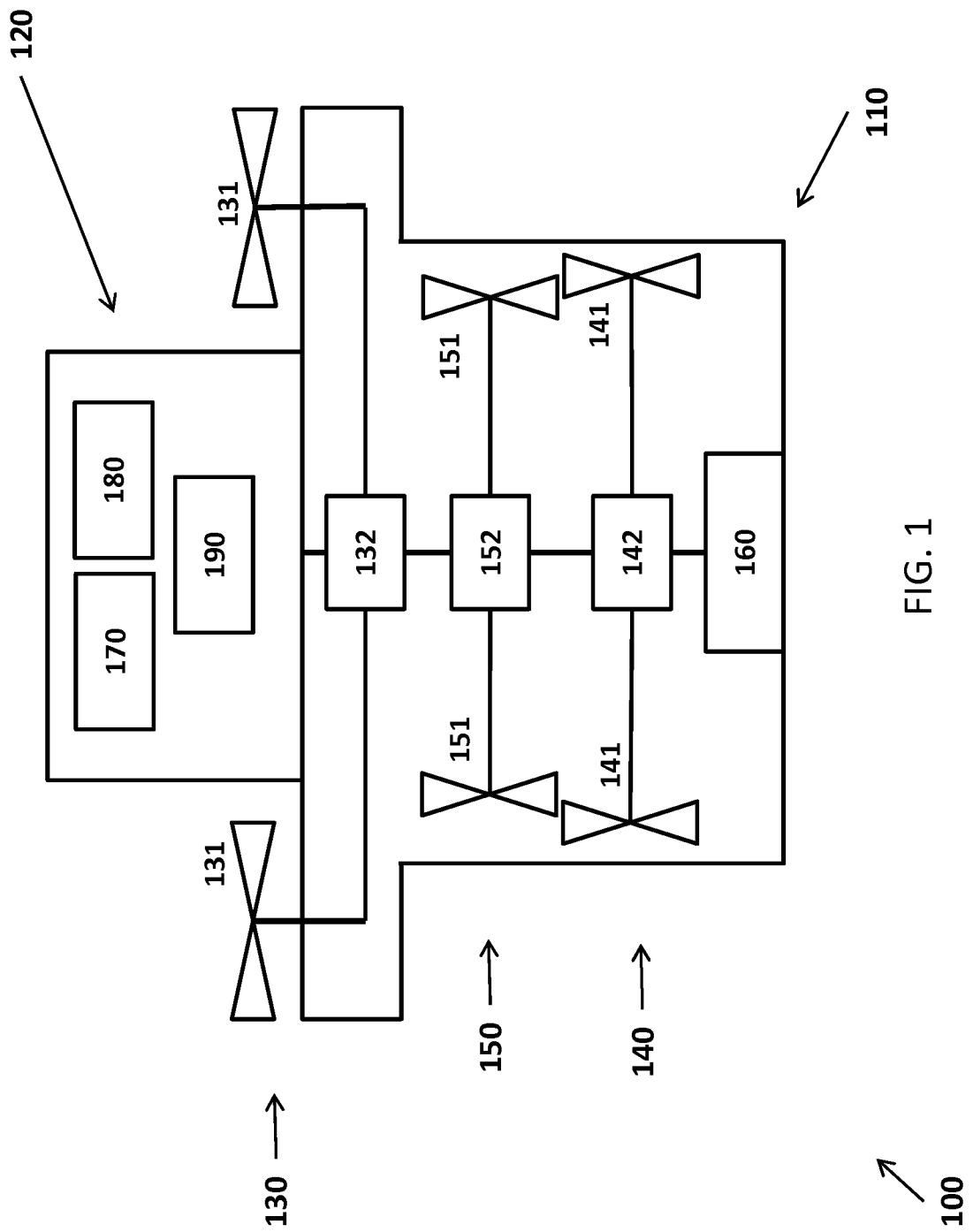
FIG. 1 is a schematic diagram of a wirelessly controlled vehicle when the vehicle is in air travel mode, according to embodiments of the present invention.

The present invention discloses a wirelessly controlled vehicle that is configured to travel in air, on liquid and under liquid while maintaining an ability to communicate with a remote operator through wireless communication during these operating modes. The features of being able to travel in multiple media (e.g. air and water) and to wirelessly communicate with a remotely located operator may eliminate or ameliorate one or more problems when remotely deploying the wirelessly controlled vehicle using currently available devices. The wireless communication may be maintained when the wirelessly controlled vehicle is travelling in air, on liquid or even under liquid. While the vehicle may be remotely and wirelessly controlled by a human operator, the vehicle can also be autonomously operated based on pre-programmed algorithms and/or itineraries. The vehicle may be controlled by both human operators and pre-programmed algorithms and/or itineraries. According to some embodiments of the present invention, the wirelessly controlled vehicle may be an unmanned vehicle. In some embodiments, the wirelessly controlled vehicle may be configured to be capable of travelling to an inspection site under its own power and optionally submerging to perform the desired inspection. In some embodiments, the wirelessly controlled vehicle is configured to evade detection for covert operation of the vehicle. For example, the vehicle can be configured to submerge for detection evasion.

According to some embodiments of the present invention, the wirelessly controlled vehicle comprises a submerging body, a surface body, a propulsion system and a communication system communicatively connecting the surface body and the submerging body. In this type of embodiments, the propulsion system may be able to support the vehicle travelling in air, on liquid and under liquid. According to some embodiments, there are at least two separate propulsion systems, wherein a first propulsion system is an air propulsion system and the second propulsion system is a liquid propulsion system. In some embodiments, the communication system communicatively connecting the surface body and the submerging body is provided by a tether or a wireless communication system wirelessly connecting the submerging body and the surface body. According to embodiments, the wireless communication is configured to wirelessly transfer data indicative of the operational instructions between the submerging body and the surface body, and as such is specifically configured for wireless communication within a liquid.

According to embodiments of the present invention, the submerging body is configured to allow the wirelessly controlled vehicle to fly through and maintain its position (i.e. hover) in air and to move through and maintain its position on and under liquid. The surface body is configured to be coupled to the submerging body while the wirelessly controlled vehicle is maintaining its position (i.e. hovering) or travelling in air and also configured to be decoupled from the submerging body while the vehicle is submerged. In some embodiments, the submerging body and the surface body are communicatively connected by the tether. The tether enables the submerging body and the surface body to communicate with each other at all times even when they are physically separated from one another. In some embodiments, the submerging body and the surface body are communicatively connected by one or more wireless communication systems. The wireless communication system can be operative even in liquid and enables the submerging body and the surface body to communicate with each other through not only air but also liquid. As a result, using the wireless communication system, the submerging body and the surface body may be able to communicate with each other at all times when they are physically separated.

According to embodiments of the present invention, the surface body is configured to be coupled to the submerging body when the vehicle is travelling in air. The surface body may also be configured to be coupled to the submerging body when the vehicle is travelling on surface of the liquid. The submerging body and the surface body may maintain the coupling via various coupling means. For example, the submerging body and the surface body can be coupled through one or more of mating receptacles, magnetic connectors, latches and other electrical or mechanical connectors that can jointly hold the two bodies together.

According to embodiments, the surface body is configured to be decoupled from the submerging body when the vehicle is travelling under liquid (i.e. submerged travel). Further, according to embodiments, the surface body is configured to at least in part float on the liquid during submerged travel. Therefore, during submerged travel, only the submerging body may be submerged and the surface body may be at least in part be floating on the liquid. As noted, the submerging body and the surface body are still communicatively connected to each other during the submerged travel via the tether or the wireless communication system.

According to embodiments, the surface body is configured to wirelessly receive operational instructions during the vehicle's submerged travel. According to embodiments, the surface body is also configured to wirelessly receive operational instructions while the wirelessly controlled vehicle is travelling or hovering in air or on the surface of liquid. The surface body may receive the operational instructions from a remote controller.

According to embodiments, the remote controller may be configured in a variety of ways. In some embodiments, the remote controller is a simple mobile wireless controller providing operational instructions to the vehicle. In some embodiments, the remote controller may be a command station that is located on ground remotely from the vehicle. The remote controller may be maneuvered by a human operator, an autonomous system with pre-programmed algorithm and itineraries, or a combination of the human operator and the autonomous system. According to embodiments, the remote controller may be remotely located substantially anywhere as long as the remote controller can wirelessly communicate with the wirelessly controlled vehicle. The wireless communication between the remote controller and the wirelessly controlled vehicle may eliminate time and cost constraints to mobilize the wirelessly controlled vehicles and therefore contribute to cost reduction in operating the wirelessly controlled vehicle.

According to embodiments, the surface body may be further configured to transmit various types of data to the remote controller, either directly or indirectly. The data may be statistical and informative and/or operational and instructional data. The data may be transmitted to the remote controller to adjust operational instructions, which will be delivered to the submerging body and/or the surface body, depending on the instruction.

According to embodiments of the present invention, the surface body may comprise a communication system in order to transmit and receive various types of data from the remote controller. According to embodiments, the communication system may comprise a wireless signal receiver that wirelessly receives operational instructions from the remote controller. The communication system may also comprise a transmitter that wirelessly sends various types of data to the remote controller. The communication system may further comprise one or more of routers, antennas and other networking devices to enhance wireless communication between the remote controller and the surface body and to extend the range that wireless radio signals can travel between the remote controller and the surface body. The communicative performance enhancing components may also perform one or more of amplification of the signal, focusing the direction of the signal, beam shaping and the like of the wireless signal. In some embodiments, the communication system may be operative using one or more types of signals, for example electromagnetic radiations (e.g. radio waves), electrical signals, magnetic signals, acoustic signals (e.g. sound waves) and optical signals (e.g. light waves). The one or more types of signals may be used for communication between the remote controller and the surface body. In some embodiments, the communication system contained in the surface body may operate all the time. In some embodiments, the communication system contained in the surface body may operate only during the submerged travel mode (i.e. while the submerging body of the vehicle is submerged under liquid).

In some embodiments, the submerging body may also comprise a communication system in order to transmit and receive various types of data from the remote controller. Similar to the communication system contained in the surface body, the communication system in the submerging body may comprise a wireless signal receiver that wirelessly receives operational instructions from the remote controller. The communication system may also comprise a transmitter that wirelessly sends various types of data to the remote controller. The communication system may further comprise one or more of routers, antennas and any other networking devices to enhance performance of the wireless communication between the remote controller and the surface body and to extend the range that wireless radio signals can travel between the remote controller and the surface body. One or more communicative performance enhancing components may also be present in the submerging body. In some embodiments, the communication system in the submerging body may be operative using one or more types of signals, for example electromagnetic radiations (e.g. radio waves), electrical signals, magnetic signals, acoustic signals (e.g. sound waves) and optical signals (e.g. light waves). In some embodiments, the one or more types of signals may be used not only for communication between the remote controller and the surface body but also for communication between the surface body and the submerging body. In some embodiments, the communication system contained in the submerging body may be an auxiliary communication system that may only operate for the purpose of supporting the communication system placed on the surface body. In some embodiments, the communication system contained in the submerging body may use different frequency channels from the communication system of the surface body. In some embodiments, the communication system of the submerging body may operate only when the communication system of the surface body does not operate properly. It is understood that the communication system contained in the submerging body may not be capable of operating with effective performance while the submerging body is submerged under liquid, due to limitations of currently available wireless communication technology.

According to embodiments of the present invention, the submerging body comprises one or more propulsion systems. In embodiments where a single propulsion system is provided, the propulsion system is configured for operation in air and liquid, and as such provides motive forces for the submerging body in both air and liquid. In some embodiments, there are multiple propulsion systems which may be tailored for propulsion in a particular medium or for a particular purpose. For example, the propulsion system can be an air propulsion system, a liquid propulsion system or a submergence propulsion system. In some embodiments, the surface body may also comprise one or more propulsion systems, which may be an air propulsion system or a liquid propulsion system or both. In some embodiments, the submerging body may comprise a plurality of air propulsion systems, a plurality of liquid propulsion systems and/or a plurality of submergence propulsion systems. Each air, liquid, and submergence propulsion system can be configured for air travel, surface travel (e.g. travel on surface of liquid) or submerged travel, respectively. In some embodiments, the air propulsion system is operative mainly during air travel, and the liquid system and submergence propulsion system are operative during surface travel and submerged travel. In some embodiments, one or more the air propulsion system, the liquid propulsion system, and the submergence propulsion system may be operative during surface travel.

According to embodiments, the air propulsion system may comprise one or more mechanical means generating propulsive forces. In some embodiments, the air propulsion system may be similar to the rotor system of the helicopter or multicopter, which allows the vehicle to make vertical and horizontal movements, both in forward and backward directions, as well as to maintain its position in the air. In some embodiments, the air propulsion system may be similar to a reaction engine producing vertical or horizontal thrusts, such as jet turbines. In some embodiments, the air propulsion system may comprise one or more mechanical means creating a lift force (e.g. mechanical aerodynamic force produced by a slide object moving through fluid). In some embodiments, the one or more mechanical means creating a lift force may be wings. In some embodiments, the wings may be fixed onto the body to which it is attached, e.g. the submerging body or the surface body. In some embodiments, the wings may be retractable into the body to which it is attached, e.g. the submerging body or the surface body. The propulsive force may be obtained by a mechanical apparatus converting rotational or other motive energy into vertical and horizontal thrusts. The mechanical apparatus may be a set of propellers or propelling blades, fans or other air propulsion system. In some embodiments the propellers or propelling blades are transformable. For example, the blade angles for the propellers are adjustable. In some embodiments the propellers or propelling blades are retractable so that the propellers or propelling blades are hidden or retracted when not in use. For example, the air propulsion system may be retractable into the body to which it is attached, e.g. the submerging body or the surface body. Power for the operation of the air propulsion system may be created by a motor or engine, for example a diesel or gasoline engine or an electrical motor, or other power generation system as would be readily understood.

According to embodiments, the liquid propulsion system may comprise one or more mechanical means generating liquid propulsive forces. In some embodiments, the liquid propulsion system may be similar to propulsion systems of submarines, which allow the watercraft to make vertical and horizontal movements, both in forward and backward directions, as well as to hover under water. The propulsive force may be obtained by mechanical apparatus converting rotational or other motive energy into vertical and horizontal thrusts. The mechanical apparatus may be a set of propellers or propelling blades, fans screws, jets or other liquid propulsion system. In some embodiments, the propellers or propelling blades are transformable. For example, the blade angles for the propellers are adjustable. In some embodiments, the propellers or propelling blades are retractable so that the propellers or propelling blades are hidden or retracted when not in use. For example, the liquid propulsion system may be retractable into the submerging body. Power for the operation of the liquid propulsion system may be created by a motor or engine, for example a diesel or gasoline engine or an electrical motor, or other power generation system as would be readily understood. In some embodiments, the liquid propulsion system provides vertical movement of the submerging body in cooperation with other components of the vehicle, for example the submergence system, cameras, lights, depth sensors, or moisture sensors.

According to some embodiments which include both an air propulsion system and liquid propulsion system, the air propulsion system is configured to be operatively coupled to the submerging body, the surface body or both the submerging body and the surface body. Unlike the air propulsion system, the liquid propulsion system is configured to be operatively coupled to the submerging body only. This is because the surface body is configured to at least in part float on the surface of the liquid when the vehicle is performing submerged travel. During submerged travel, only the submerging body is submerged under water. Accordingly, the liquid propulsion system should be coupled to the submerging body as the liquid propulsion system may not be able to mobilize the vehicle under liquid due to insufficient submergence level if the liquid propulsion system is only coupled to the surface body. In some embodiments, there may be an additional liquid propulsion system installed at the surface body. The liquid propulsion system contained in the surface body may dynamically position or reposition the location of the surface body on surface of the liquid when the submerging body of the vehicle is submerged under liquid.

According to some embodiments which include both an air propulsion system and liquid propulsion system, the air propulsion system and the liquid propulsion system may operate independently. The design for separate and independent operating propulsion systems is devised to deliver more effective and powerful thrusts in both air travel and submerged travel. This is because, at least in some cases, propulsion systems for air travel do not operate as efficiently as when they operate in water; and propulsion systems for submerged travel do not operate efficiently as efficiently as when they operate in air.

According to embodiments of the present invention, only a hybrid propulsion system may be adapted for the wirelessly controlled vehicle when efficiency level of the single propulsion system is sufficiently high for air propulsion, surface propulsion and submerged propulsion. In embodiments with a single propulsion system, the propulsion system may be operatively coupled to the submerging body. The propulsion system may not be coupled to the surface body because the propulsion system would not be able to mobilize the vehicle under liquid due to insufficient submergence level, as the surface body is configured to float at least in part on the surface of the liquid during submerged travel of the vehicle.

According to some embodiments of the present invention, the submerging body may further comprise a submergence system. The submergence system controls the submergence level of the submerging body under liquid. The submergence system may comprise one or more of submergence propulsion systems and ballast systems. The submergence propulsion system may generate vertical propulsive forces upwards, to make the submerging body submerge more deeply in liquid, or downwards, to make the submerging body ascend to shallower level in liquid or to let the submerging body re-emerge on or near surface of the liquid. One example of the submergence propulsion system may be vertical water thrusters. Another submergence system is a ballast system which may comprise one or more ballast tanks controlling the submergence level of the submerging body. The ballast system may control the submergence level by loading and discharging liquid into the one or more ballast tanks. In some embodiments, the submerging body itself functions as the ballast tank. The ambient liquid may be loaded into and discharged from the inside of the submerging body. In this case, the interior of the submerging body is at least in part hollow; and any components inside the submerging body are protected for exposure to the liquid. In some embodiments, the ballast system may comprise one or more separate ballast tanks. The ballast tanks may be deployed upon transition from air operation mode (e.g. fly in the air) to submerged operation mode (e.g.

underwater travel); and recovered upon transition from submerged operation mode back to air operation mode. In some embodiments, the submergence system may provide vertical movement of the submerging body in cooperation with the liquid propulsion system.

According to some embodiments with the tether communicatively connecting submerging body and the surface body, the surface body comprise a winch that spools and unspools the tether communicatively connecting the submerging body and the surface body. In some embodiments, the winch may be controlled by a winch controller that may be contained in the surface body. The winch controller may perform its functions based on operational instructions received from the remote controller. The operational instructions from the remote controller may be delivered through a control system integrated in the submerging and/or surface bodies. In some embodiments, the winch controller may function autonomously without the remote controller's instruction. In such cases, the operation of the winch controller may be (autonomously) determined by the control system. The control system may command the winch controller based on various information including submergence level of the submerging body.

According to some embodiments of the present invention, one or more of the submerging body and the surface body may comprise a navigation system navigating the wirelessly controlled vehicle. The navigation system may comprise one or more of GPS, maps, cameras, sensors (e.g. altitude sensors, moisture sensors), processors and other peripheral devices. The navigation system may transmit various data related to movement of the vehicle to the remote controller. For example, the current position of the submerging body and the current position of the surface body are collected and transmitted to the remote controller. The position of submerging body and surface body may be transmitted to the remote controller separately or concurrently. The navigation system may collect information on whether vehicles, aircrafts, vessels, birds, vegetation or any other hazards or obstacles exist near the vehicle; and transmit this information to the remote controller or a system that the vehicle internally control its operation (e.g. control system as illustrated below). The navigation system may collect location data or information on surrounding environments through cameras or sensors (e.g. altitude sensors, moisture sensors) installed on the vehicle or data received from other external devices. The navigation system may calculate the best routes to the destination or the best itineraries for exploration based on various information including the collected data.

According to embodiments of the present invention, one or more of the submerging body and the surface body comprises a control system. The control system may include one or more processors, memories, storages, transmitters, receivers, and other parts required to operate the control system. The control system may control operation of the wirelessly controlled vehicle in based on instructions based on received signals, a stored set of instructions or a combination thereof. The control system may command components included in the vehicle based on operational instructions received from the remote controller. In some embodiments, the control system may wirelessly receive the operational instructions from the remote controller. For example, when the vehicle is operated to travel from air to underwater, the control system may instruct the air propulsion system to land the vehicle on the water surface, instruct the coupling means (e.g. mating receptacle, magnetic connector) to decouple the submerging body and the surface body, instruct the winch controller or the winch to unspool the tether, instruct the submergence system to submerge the decoupled submerging body underwater in tandem with the winch, and instruct the liquid propulsion system to generate thrusts to perform submerged travel.

In some embodiments, the control system may instruct the components of the wirelessly controlled vehicle autonomously, without operational instructions from the remote controller, based on the algorithms, plans, itineraries or any other governing principles pre-programmed in the system. The autonomous command of the control system may be intervened by the remote controller, for example in emergency situations. In some embodiments, the control system provides instructions without consultation with the remote controller in an emergency, for example when the communication system cannot receive any operational instruction from the remote controller.

According to embodiments with the tether communicatively connecting the submerging body and the surface body, the tether is configured to transfer data indicative of the operational instructions between the submerging body and the surface body. The operational instructions may be received by the communication system from the remote controller. The tether may be further configured to transfer the various data including those statistical and operational data between the submerging body and the surface body. The statistical and operational data may be collected by one or more components of the vehicle including the navigation system, the control system and the propulsion systems. According to some embodiments, the tether may be spooled onto and unspooled from a winch which may be installed on the surface body. The length of unspooled tether may be adjusted by spooling the tether onto and unspooling the tether from the winch. The timing of when to adjust the length of unspooled tether may be determined based on current position of the submerging body under liquid, for example submergence level of the submerging body. The adjustment of the unspooled tether length may allow for the maintaining of a desired level of tension on the tether so that the risk that the unspooled tether becomes entangled is decreased.

According to embodiments with the wireless communication system wirelessly connecting the submerging body and the surface body, the wireless communication system may be configured to wirelessly transfer data indicative of the operational instructions between the submerging body and the surface body. In some embodiments, the wireless communication system may be wireless optical communication devices. The wireless communication system should provide a sufficiently long range for the wireless communication between the submerging body and the surface body. For example, the wireless communication system can have a range of approximately 100 ft or longer in unobstructed seawater. According to some embodiment with the wireless communication system connecting the surface body and the submerging body, the wireless communication system may be configured to comprise a modem in the surface body and a transmitter and a receiver in the submerging body. According to embodiments, when the wirelessly controlled vehicle is within the range of the modem, the vehicle may be controlled by operational instructions from the remote controller. The operational instructions may be wirelessly transmitted from the surface body to the control system in the submerging body through the wireless communication system. When the wirelessly controlled vehicle is outside of the modem range, the vehicle may be controlled autonomously according to the pre-programmed algorithm.

According to embodiments of the present invention, the surface body may further comprise one or more additional components. In some embodiments, there are one or more energy generation components, for example solar panels or mini wind turbines, installed on exterior of the surface body. In some embodiments, the one or more additional components may be provided in order for the wirelessly controlled vehicle to perform extra functions such as, but not limited to, surveying, intervention, payload deployment and payload retrieval. In some embodiments, the additional component may be integrated into the wirelessly controlled vehicle. In some other embodiments, the additional components may be appended to the wirelessly controlled vehicle, as add-ons.

According to embodiments of the present invention, the wirelessly controlled vehicle is configured to travel as well as hover or maintain its position in multiple media (e.g. air, water, oil). In some embodiments, the wirelessly controlled vehicle may have capability to fly and hover in air, to move through and hover on surface of water, and to travel and hover under water.

According to embodiments, the wirelessly controlled vehicle is configured to travel or hover in air. The vehicle may be in air travel mode while the vehicle is either flying or hovering in air. During the air travel mode, the submerging body and the surface body of the vehicle are coupled to each other. The coupling may be maintained by one or more of mechanical coupling means such as mating receptacles, magnetic connectors, fasteners or any other electrical or mechanical connectors that can jointly hold the two bodies.

According to embodiments, while the vehicle is in the air travel mode, the air propulsion system is activated and operates to make the wirelessly controlled vehicle travel or hover in air. The air propulsion system generates propulsive forces or thrusts which allow the vehicle to make vertical and horizontal movements, both in forward and backward directions, as well as to maintain its position in the air.

In some embodiments, the liquid propulsion system of the wirelessly controlled vehicle may become inoperative while the vehicle is in the air travel mode. The liquid propulsion system operates separately and independently from the air propulsion system. In some embodiments, the liquid propulsion system is retractable at least in part so that the retractable part of the liquid propulsion system may be retracted into the submerging body when the vehicle is flying in air as the liquid propulsion system may not be in use during this time.

In some embodiments, the submergence system of the wirelessly controlled vehicle may become inoperative, similar to the liquid propulsion system, during the air travel mode. In some embodiments, the submergence system is retractable at least in part so that the retractable part of the submergence system may be retracted into the submerging body when the vehicle is flying or hovering in air as the submergence system may not be in use during this time.

According to embodiments, the wirelessly controlled vehicle is configured to travel or hover under liquid. The vehicle may be in submerged travel mode while the vehicle is submerged and moving or hovering under liquid. During the submerged travel mode, the submerging body and the surface body of the vehicle are decoupled from each other so that only the submerging body can be submerged during the submerged travel. The surface body, on the other hand, is at least in part floating on the liquid to communicate with the remote controller (e.g. receiving operational instructions from the remote controller). Despite of physical separation, the submerging body and the surface body are still communicatively connected to each other through the tether or the wireless communication system during the submerged travel. Thus, when the surface body receives from the remote controller operational instructions regarding the submerging body's operation, the instructions can be transferred to the submerging body.

According to embodiments, while the vehicle is in the submerged travel mode, the liquid propulsion system and the submergence system are activated and operated to allow the wirelessly controlled vehicle to make vertical and horizontal movement or to maintain its position under liquid. The liquid propulsion system may generate propulsive forces, which allow the vehicle to make vertical and horizontal movements, both in forward and backward directions, as well as to hover under liquid with or without cooperation of the submergence system.

According to embodiments, while the vehicle is in the submerged travel mode, the submergence propulsion system may generate vertical propulsive forces upwards, to make the submerging body submerge more deeply in liquid, or downwards, to make the submerging body ascend to shallower level in liquid or to let the submerging body re-emerge on surface of liquid. In some embodiments with the tether communicatively connecting the submerging body and the surface body, upon change of the submergence level of the vehicle, the length of unspooled tether is adjusted by spooling the tether onto and unspooling the tether from the winch. By adjusting the unspooled tether length, a desired level of tension on the tether may be maintained so that the risk that the unspooled tether being entangled is decreased.

According to embodiments, the air propulsion system of the wirelessly controlled vehicle operates separately and independently from the liquid propulsion system and the submergence system. In some embodiments, the air propulsion system may become inoperative while the vehicle is in the submerged travel mode. In some embodiments, the air propulsion system is retractable at least in part so that the retractable part of the air propulsion system may be retracted when the vehicle is submerged under liquid as the air propulsion system may not be in use during this time. In some embodiments, the air propulsion system may be operative even when the vehicle is in the submerged travel mode. For example, if the air propulsion may be configured to have capability to move the surface body to another location or allow the surface body to hover when the submerged body is (vertically) elevating towards the surface of the liquid. The liquid propulsion system, with or without cooperation of the submergence system, may allow the submerged body to be coupled to the moving surface body.

According to embodiments, the wirelessly controlled vehicle is configured to travel on surface of liquid. The vehicle may be in surface travel mode while the vehicle is traveling or hovering on surface of liquid. During the surface travel mode, the submerging body and the surface body of the vehicle may be coupled to each other. The coupling may be maintained by one or more of mechanical coupling means such as mating receptacles, magnetic connectors, fasteners or any other electrical or mechanical connectors that can jointly hold the two bodies.

According to embodiments, while the vehicle is in the surface travel mode, the air propulsion system and the liquid propulsion system are activated and operated to make the wirelessly controlled vehicle travel or hover on surface of liquid. The air propulsion system and the liquid propulsion system may cooperatively operate the vehicle on surface of liquid. For example, the air propulsion system and the liquid propulsion system may cooperatively generate vertical and/ or horizontal propulsive forces to allow the vehicle to move through or hover on surface of liquid.

According to embodiments, one or more the air propulsion system, the liquid propulsion system, and the submergence system may provide vertical propulsive force or thrust to keep the wirelessly controlled vehicle on surface of liquid. In some embodiments, the submergence system may provide at least some buoyancy to the wirelessly controlled vehicle. In some embodiments, there may be one or more buoys, which provide additional buoyancy to the vehicle, may be operatively coupled to the submerging body or the surface body.

In some embodiments, the submergence system of the wirelessly controlled vehicle may become inoperative during the surface travel mode. In some embodiments, the submergence system is retractable at least in part so that the retractable part of the submergence system may be retracted into the submerging body when the vehicle is flying or hovering in air as the submergence system may not be in use during this time.

The vehicle is configured to transition from one operation mode to another operation mode. For example, the vehicle can change its operation mode from air travel mode to surface travel mode (i.e. the mode configured to travel on surface of liquid). The vehicle can also change its operation mode from the surface travel mode to the submerged travel mode. Further, the vehicle can change the operation mode from the submerged travel mode to the surface travel mode and from the surface mode to the air-travel mode. In some embodiments of the present invention, the vehicle may be configured to seamlessly travel from air to under liquid or from under liquid to air. The vehicle may change its operation mode quickly and smoothly from the submerged mode to the air travel mode or from the air travel mode to the submerged mode without staying in the surface travel mode during the transition.

According to embodiments, the wirelessly controlled vehicle is able to switch its operation mode from the air travel mode to the surface travel mode. To change the mode, the vehicle may land on surface of liquid that the vehicle travel upon or submerge into. Once the vehicle is on liquid, the submerging body and the surface body may be decoupled from each other.

According to embodiments, the submergence system controls the submergence level of the submerging body under liquid. The submergence propulsion system may generate vertical propulsive forces upwards, to make the submerging body submerge more deeply in liquid. In some embodiments with the tether communicatively connecting the submerging body and the surface body, the length of the unspooled tether will be adjusted upon changing the submergence level. It is understood that the submergence of the vehicle can at least in part be a result of the mass of the submerging body. In some embodiments the submergence propulsion system can provide a level of floatation to the vehicle when travel on the surface is desired.

According to embodiments, despite of the physical separation, the submerging body and the surface body are still communicatively connected to each other through the tether or the wireless communication system during the submerged travel. Thus, when the surface body receives operational instructions from the remote controller regarding the submerging body's operation, the instructions can be transferred to the submerging body. In some embodiments with the tether communicatively connecting the submerging body and the surface body, the length of the unspooled tether can be adjusted upon the change of submergence level of the vehicle in order to maintain the communicative connection between the submerging body and the surface body. The tension on the tether may be also maintained through adjustment of the unspooled tether length. In some embodiments, the control system in the submerging body will instruct the winch or the winch controller to adjust the length of the tether.

According to embodiments, the wirelessly controlled vehicle is able to switch its mode from the submerge travel mode to the surface travel mode. To change the mode, the submerging body of the vehicle may be elevated to on or near surface of liquid. Once the submerging body of the vehicle is sufficiently elevated to on or near surface of liquid, the top of the submerging body may physically contact to the bottom of the surface body. Upon the contact, the submerging body and the surface body may be coupled to each other.

According to embodiments, the submergence system controls the submergence level of the submerging body under liquid. The submergence propulsion system may generate vertical propulsive forces downwards to make the submerging body ascend to shallower level in liquid and let the submerging body re-emerge on or near surface of liquid.

According to embodiment with a tether communicatively connecting the submerging body and the surface body, the length of the unspooled tether will be adjusted upon the change of submergence level of the vehicle. The tension on the tether may be also maintained through adjustment of the tether length. In some embodiments, the control system in the submerging body will instruct the winch or the winch controller to adjust the length of the tether. In some embodiments, the winch or the winch controller and the submergence system cooperatively work in tandem to elevate the submerged submerging body to on or near surface of liquid while maintaining tension on the tether.

According to some embodiments, the vehicle has associated therewith a sensor system which can provide information relating to the mode of operation of the vehicle and additionally to provide an indication of when a change in mode of operation is required. For example, a moisture sensor can be coupled to the vehicle such that upon contact with the surface of the liquid the vehicle may automatically change from air travel mode to surface travel mode or a submergence mode. In some embodiments, this sensor information may be transmitted to the remote controller for confirmation by the operator.

Figure 2:
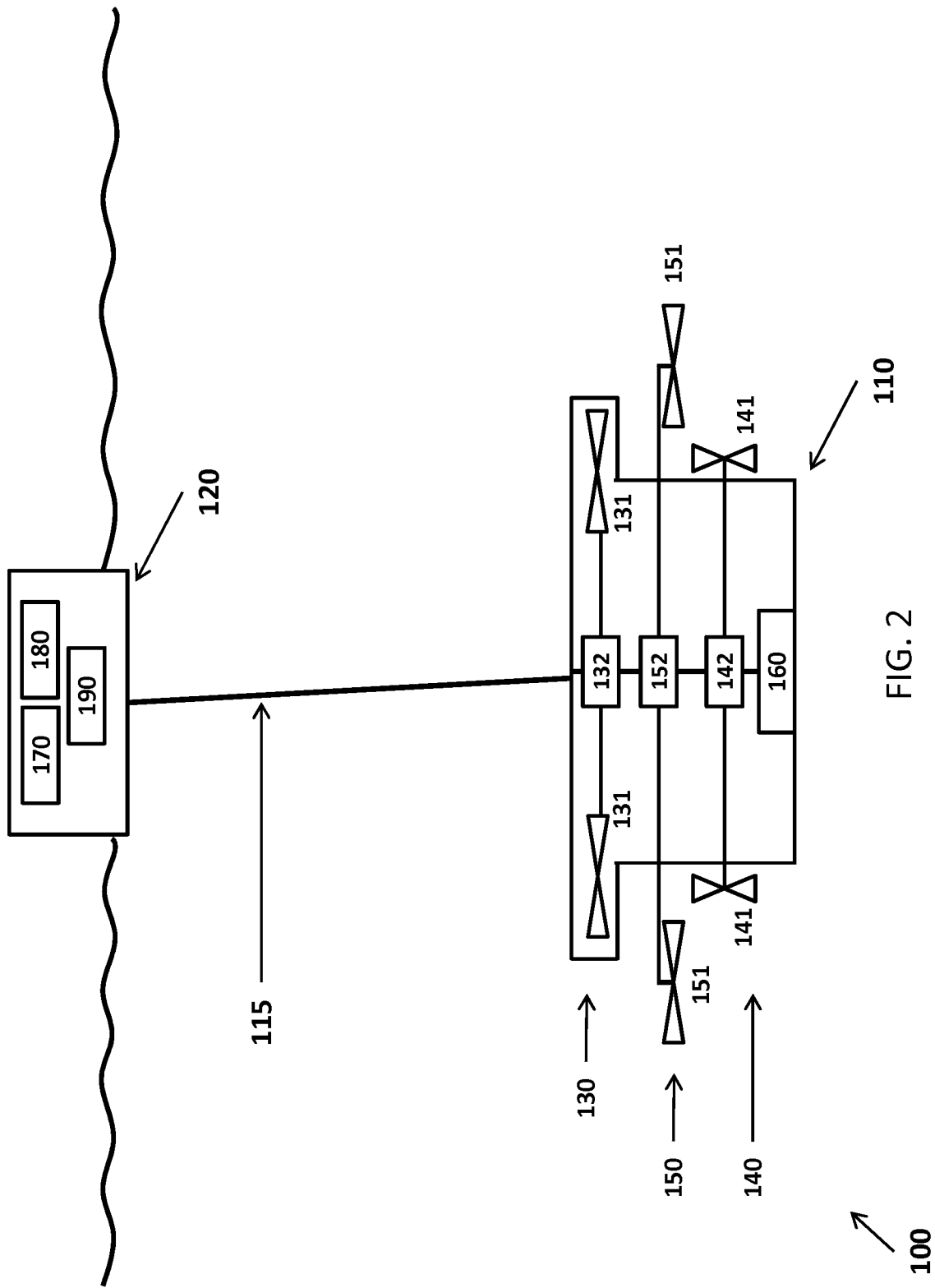
FIG. 2 is a schematic diagram of the same wirelessly controlled vehicle illustrated in FIG. 1 when the vehicle is in submerged travel mode.

FIGS. 1 and 2 illustrate a wirelessly controlled vehicle 100 in accordance with an embodiment of the present invention. The vehicle 100 is unmanned and adapted for both air and underwater travel. The vehicle 100 is capable of flying through air, moving through water, maintaining its position and hovering in both media (i.e. air and water). The vehicle 100 comprises the submerging body 110, the tether 115, the surface body 120, the air propulsion system 130, the liquid propulsion system 140, the submergence system 150, the control system 160, the winch 170, the navigation system 180, and the communication system 190.

The tether 115 is communicatively connecting the submerging body 110 and the surface body 120. The tether 115 is configured to transfer data including the operational instructions and or informative data between the submerging body 110 and the surface body 120. The tether 115 is operatively connected to the winch 170 which controls the length of the tether 115 unspooled. The winch 170 is operatively connected to the control system 160 contained in the submerging body 110.

The air propulsion system 130 is operatively coupled to the submerging body 110. Similarly, the liquid propulsion system 140 and the submergence system 150 are operatively coupled to submerging body 110. The air propulsion system 130 comprises two or more sets of the propelling blades 131 (two sets are shown in the figure) and the electrical motor 132. The two or more sets of the propelling blades 131 and the electrical motor 132 are operatively connected. The liquid propulsion system 140 comprises two or more sets of the propelling blades 141 (two sets are shown in the figure) and the electrical motor 142. The liquid propulsion system 140 may control vertical or horizontal movements of the submerging body 110 in a liquid. The two or more sets of the propelling blades 141 and the electrical motor 142 are operatively connected. The submergence system 150 comprises one or more of submergence propulsion system and ballast system. The submergence system 150 may control vertical movement of the submerging body 110 in a liquid. The submergence propulsion system comprises propelling blades 151 and the electrical motor 152. The one or more sets of the propelling blades 151 (two sets are shown in the figure) and the electrical motor 152 are operatively connected. In some embodiments, one or more of the propelling blades 131, 141, 151 are transformable in that the blade angles for these propellers are adjustable. In some other embodiments, the propelling blades 131, 141, 151 are not transformable. The air propulsion system 130, the liquid propulsion system 140 and the submergence system 150 are operatively and communicatively connected to the control system 160, directly or indirectly through the tether 115. The operations of these systems are governed by the control system 160 based on operational instructions received from the remote controller.

The winch 170 is contained or operatively coupled to the surface body 120. The winch 170 spools and unspools the tether 115 depending on the submergence level of the submerging body 110; and is operatively connected to the control system 160 which controls operation of the winch 170.

The navigation system 180 is contained in and operatively coupled to the surface body 120. The navigation system 180 supports aerial flights, surface travels and submerged travels of the vehicle 100 by providing various data related to movement of the vehicle 100. While not shown in the figures, the navigation system 180 comprises one or more GPS, maps, cameras, sensors (e.g. altitude sensors, moisture sensors) and processors. The navigation system 180, using GPS, collects the current position of the submerging body 110 and the current position of the surface body 120. The system then provides where submerging body 110 and surface body 120 are located on map using the collected position coordinates. The navigation system 180, using the sensors, collects and transmits information on whether vehicles, aircrafts, vessels, birds, vegetation or any other hazards or obstacles exist near the vehicle. The navigation system 180, using the processors, calculates the best routes to the destination or the best itineraries for exploration based on various collected data. The navigation system 180 send the remote controller various information including the data regarding potential hazard and the best route to the destination via the communication system 190.

The communication system 190 is contained or operatively coupled to the surface body 120. While not shown in the figures, the communication system 190 comprises various components including a wireless signal receiver that wirelessly receives operational instructions from the remote controller. The communication system 190 further comprises a transmitter sending various types of data collected by various components of the vehicle 100 to the remote controller. The communication system 190 further comprises an antenna to enhance performance of the wireless communication with the remote controller.

FIG. 1 illustrates the vehicle 100 in the air travel mode. Here, the submerging body 110 and the surface body 120 are coupled each other via coupling means (not shown in the figure). The coupling means may comprise one or more of mating receptacles, magnetic connectors, fasteners and any other electrical or mechanical connectors that can jointly hold the submerging body 110 and the surface body 120.

The tether 115 is fully spooled onto the winch 170 while the vehicle is in the air travel mode. Deployment of the tether 115 is not needed because the submerging body 110 and the surface body 120 are coupled together during the air travel mode.

The air propulsion system 130 is similar to the rotor system of the helicopter or multicopter. The air propulsion system 130 generates propulsive forces and allows the vehicle 100 to make vertical and horizontal movements, both in forward and backward directions, as well as to maintain its position in the air. To obtain propulsive forces, the electrical motor 132 generates rotational energy, and the propelling blades 131 convert the rotational energy generated by the motor 132 into vertical or horizontal thrusts. The propelling blades 131 are transformable in that the blade angles for these propellers are adjustable.

The liquid propulsion system 140 and the submergence system 150 are illustrated that they are retracted into the submerging body 110. The liquid propulsion system 140 and the submergence system 150 are inoperative during the air travel mode.

While the vehicle 100 is in the air travel mode, the operation of the vehicle will be governed by the control system 160. The control system 160 sends operational instructions to each component of the submerging body 110 and the surface body 120 based on operational instructions received from the remote controller. Upon receipt of the operational instruction, each part performs the functions fulfilling the instructed operation.

The winch 170 is not operative while vehicle is in the air travel mode. As noted above, the tether 115 does not need to be spooled onto or unspooled from the winch 170 because the submerging body 110 and the surface body 120 are coupled during the air travel mode.

The navigation system 180 and the communication system 190 operate as illustrated above.

FIG. 2 illustrates the vehicle 100 in submerged travel mode. As illustrated in the figure, during the submerged travel mode, the surface body 120 may be decoupled from the submerging body 110 so that only the submerging body 110 is being submerged and the surface body 120 is at least in part floating on water. The submerging body 110 and the surface body 120 are still communicatively connected to each other via the tether 115 during the submerged travel.

The tether 115 is unspooled from the winch 170 when the vehicle is in the submerged travel mode. The length of the unspooled tether is adjusted based on the submergence level of the submerging body 110. The deeper the submerging body 110 is submerged, the longer the tether 115 should be unspooled from the winch 170. Because of the tether 115, the submerging body 110 and the surface body 120 can be communicatively connected to each other even when the submerging body 110 and the surface body 120 are physically departed from each other during the submerged travel mode.

The air propulsion system 130 is illustrated that it is retracted into the submerging body 110. The air propulsion system 130 is inoperative during the submerged travel mode.

The liquid propulsion system 140 is similar to the propulsion systems of submarines, which allow the watercraft to make vertical and horizontal movements, both in forward and backward directions as well as to hover under water. The propulsive force is obtained by the propelling blades 141 converting rotational energy into vertical or horizontal thrusts. The rotational energy may be generated by the electrical motor 142. The liquid propulsion system 140 cooperates with the submergence system 150 for vertical movement of the submerging body 110.

The submergence system 150 comprises the submergence propulsion system and ballast system. The submergence propulsion system comprises two sets of the propelling blades 151 and the electrical motor 152. The propelling blades 151 are transformable in that the blade angles for these propellers are adjustable. The submergence propulsion system is a vertical water thrusters generating vertical propulsive forces upwards, to make the submerging body submerge more deeply in liquid, or downwards, to make the submerging body ascend to shallower level in liquid or to let the submerging body re-emerge on or near surface of liquid. The ballast system in this embodiment is one or more ballast tanks. Here, the submerging body 110 is used as a ballast tank to control submergence level of the submerging body 110. For this, the interior of the submerging body 110 is designed in part hollow and all components inside the submerging body 110 is water-protected. The submergence level is controlled by loading and discharging liquid into the ballast tank (i.e. the submerging body 110). The ambient water is loaded to and discharged from inside of the submerging body 110. The amount of water loaded into the hollow interior of the submerging body 110 depends on the submergence level of the submerging body. Loading and discharging water is controlled by the control system 160.

While the vehicle 100 is in the submerged travel mode, the operation of the vehicle will be governed by the control system 160. The control system 160 sends operational instructions to each component of the submerging body 110 and the surface body 120 based on operational instructions received from the remote controller. Upon receipt of the operational instruction, each part performs the functions fulfilling the instructed operation.

The winch 170 is operative during the submerged travel mode. As noted, the winch 170 spools and unspools the tether 115 depending on the submergence level of the submerging body 110; and is operatively connected to the control system 160 which controls operation of the winch 170.

The navigation system 180 and the communication system 190 operate as illustrated above.

Figure 3A:
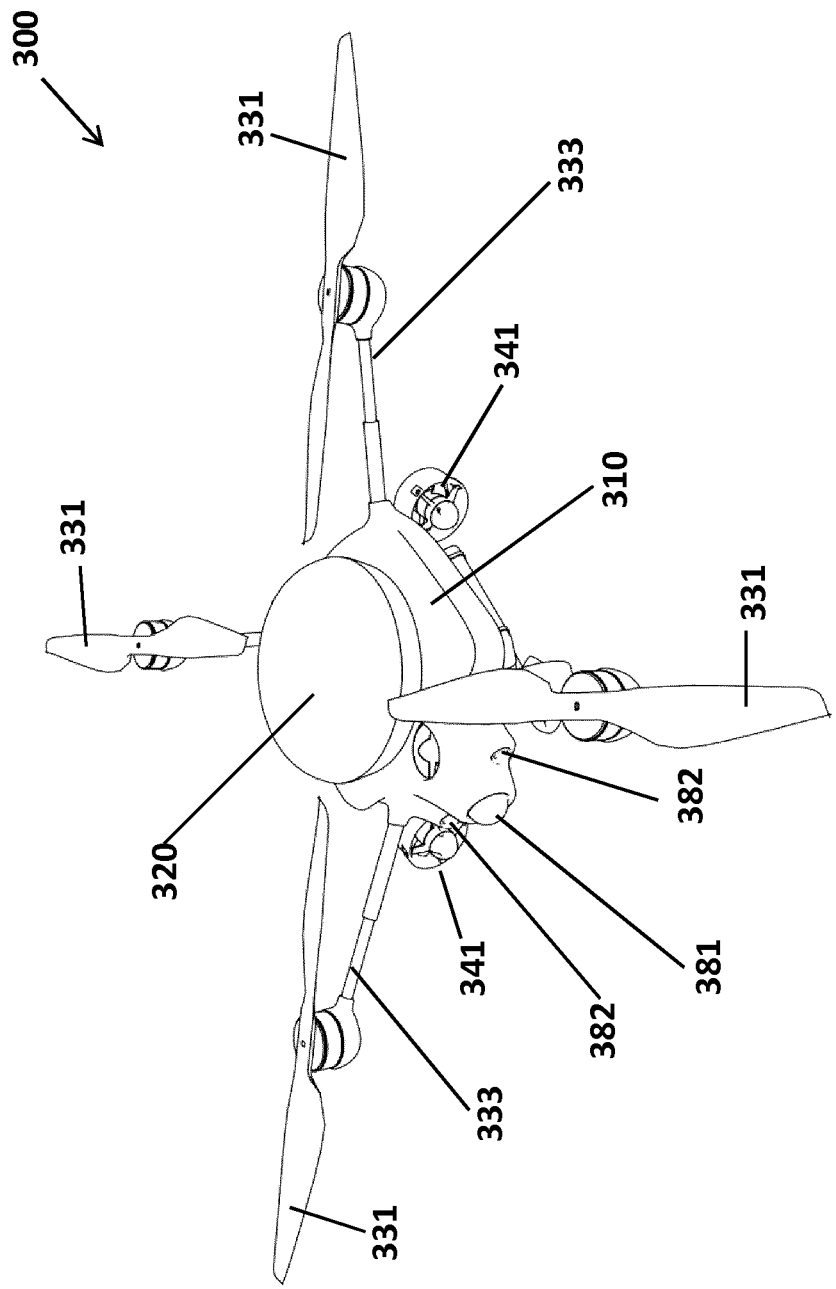
FIG. 3A illustrates a perspective view of a wirelessly controlled vehicle, when the vehicle is in air travel mode, in accordance with embodiments of the present invention.
Figure 3B:
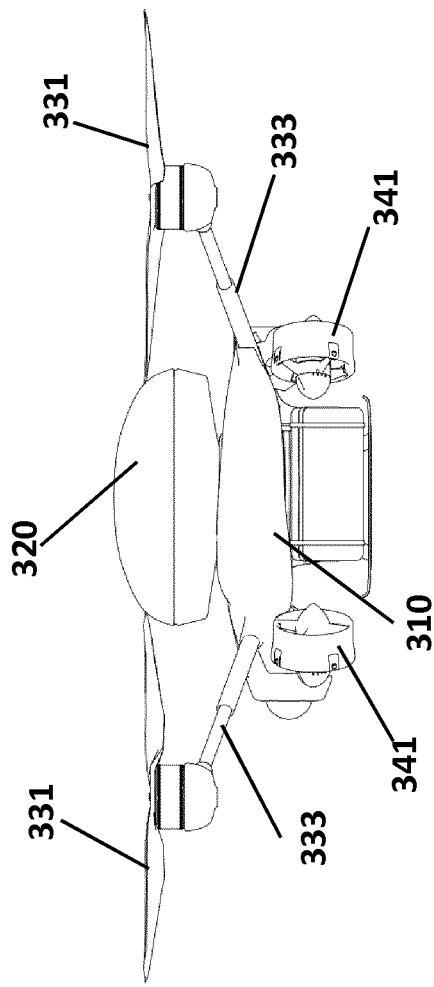
FIG. 3B illustrates a side view of a wirelessly controlled vehicle, when the vehicle is in air travel mode, in accordance with embodiments of the present invention.
Figure 3C:
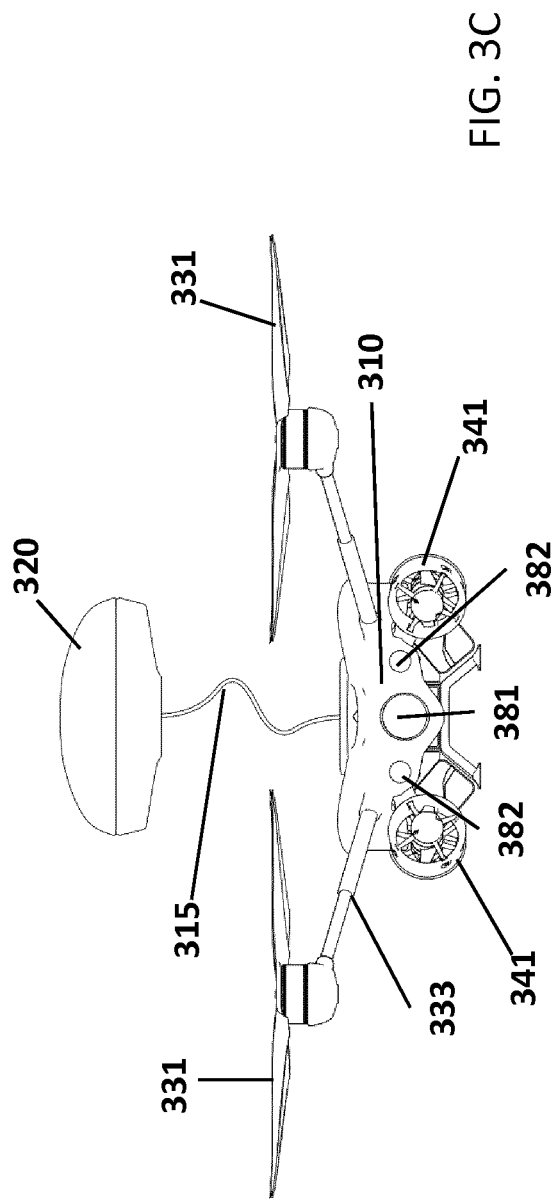
FIG. 3C illustrates a side view of a wirelessly controlled vehicle, when the vehicle is in submerged travel mode, in accordance with embodiments of the present invention.

FIGS. 3A to 3C illustrate a wirelessly controlled vehicle 300 in accordance with an embodiment of the present invention. It should be noted that the vehicle 300 is merely one example embodiment of the present invention.

FIG. 3A illustrates an example wirelessly controlled vehicle 300, in a perspective view, when the vehicle is in air travel mode. The vehicle 300 is an unmanned vehicle configured to travel both in air and liquid. The vehicle 300 comprises the submerging body 310 and the surface body 320 which are coupled to each other via coupling means (not shown in the figure). The coupling means may comprise one or more of mating receptacles, magnetic connectors, fasteners and any other electrical or mechanical connectors that can jointly hold the submerging body 310 and the surface body 320.

The submerging body 310 includes the air propulsion system, the liquid propulsion system, the submergence propulsion system and the navigation system. The air propulsion system includes four propelling blades 331 configured to convert the rotational energy generated by the motor (not shown in the figure) into vertical or horizontal thrusts. Each of the four propelling blades 331 is operatively connected to the submerging body 310 via the longitudinal connecting arms 333. The liquid propulsion system includes four propellers 341 for horizontal movement of the vehicle 300 when the vehicle 300 is under the liquid. The four propelling blades 341 are operatively connected to the four bottom corners of the submerging body 310. While not shown in the figure, the longitudinal connecting arms 333 can be retracted when the four propelling blades 341 are not in use (e.g. when the vehicle 300 travels in a submerged mode). The submergence propulsion system includes two propellers (not shown in the figure) for vertical movement of the vehicle 300 when the vehicle 300 is submerged. Each of the two propellers (not shown in the figure) is operatively connected to the bottom of the submerging body 310. The navigation system includes the camera 381 and the lights 382. The camera 381 and the lights 382 are configured to support aerial flights, surface travels and submerged travels of the vehicle 300 by providing various data (e.g. video data) related to movement of the vehicle 300. For example, the user can control the travel of the vehicle 300 at night with enhanced security as he/she can see whether there are any hazardous objects, which may cause damages to the vehicle 300, near the vehicle using the camera 381 and the lights 382. The camera 381 and the lights 382 may be attached to exterior of the submerging body 310 as shown in the figure.

FIG. 3B illustrates the same wirelessly controlled vehicle 300 illustrated in FIG. 3A, in a side view, when the vehicle 300 is in air travel mode.

FIG. 3C illustrates the same wirelessly controlled vehicle 300 illustrated in FIGS. 3A and 3B, in a side view, when the vehicle 300 is in submerged travel mode. As illustrated in the figure, during the submerged travel mode, the surface body 320 may be decoupled from the submerging body 310 so that only the submerging body 310 is being submerged and the surface body 320 can at least in part float on the surface of the liquid. The submerging body 310 and the surface body 120 are communicatively and operatively connected to each other via the tether 315 during the submerged travel mode.

The vehicle 300 includes a winch (now shown) in the surface body 320 to spool/unspool the tether 315 to adjust the length of the tether 315. The tether 315 is unspooled from the winch when the vehicle 300 is in the submerged travel mode. The length of the unspooled tether can be adjusted based on the submergence level of the submerging body 310. The deeper the submerging body 310 is submerged, the longer the tether 315 can typically be unspooled from the winch. Because of the tether 315, the submerging body 310 and the surface body 320 can be communicatively connected to each other even when the submerging body 110 and the surface body 120 are physically separated from each other during the submerged travel mode. The winch included in the surface body 320 can operate electronically and autonomously based on the submergence level of the submerging body 310. Alternatively, the length of the tether can be manually controlled by the user through the remote control.

It should be noted that while the longitudinal connecting arms 333 are not retracted in FIG. 3C, they can be retracted when the vehicle 300 is in submerged travel mode. The figure merely illustrates that, upon choice of the user, the longitudinal connecting arms 333 do not have to be retracted when the vehicle 300 is in submerged travel mode.

Figure 4:
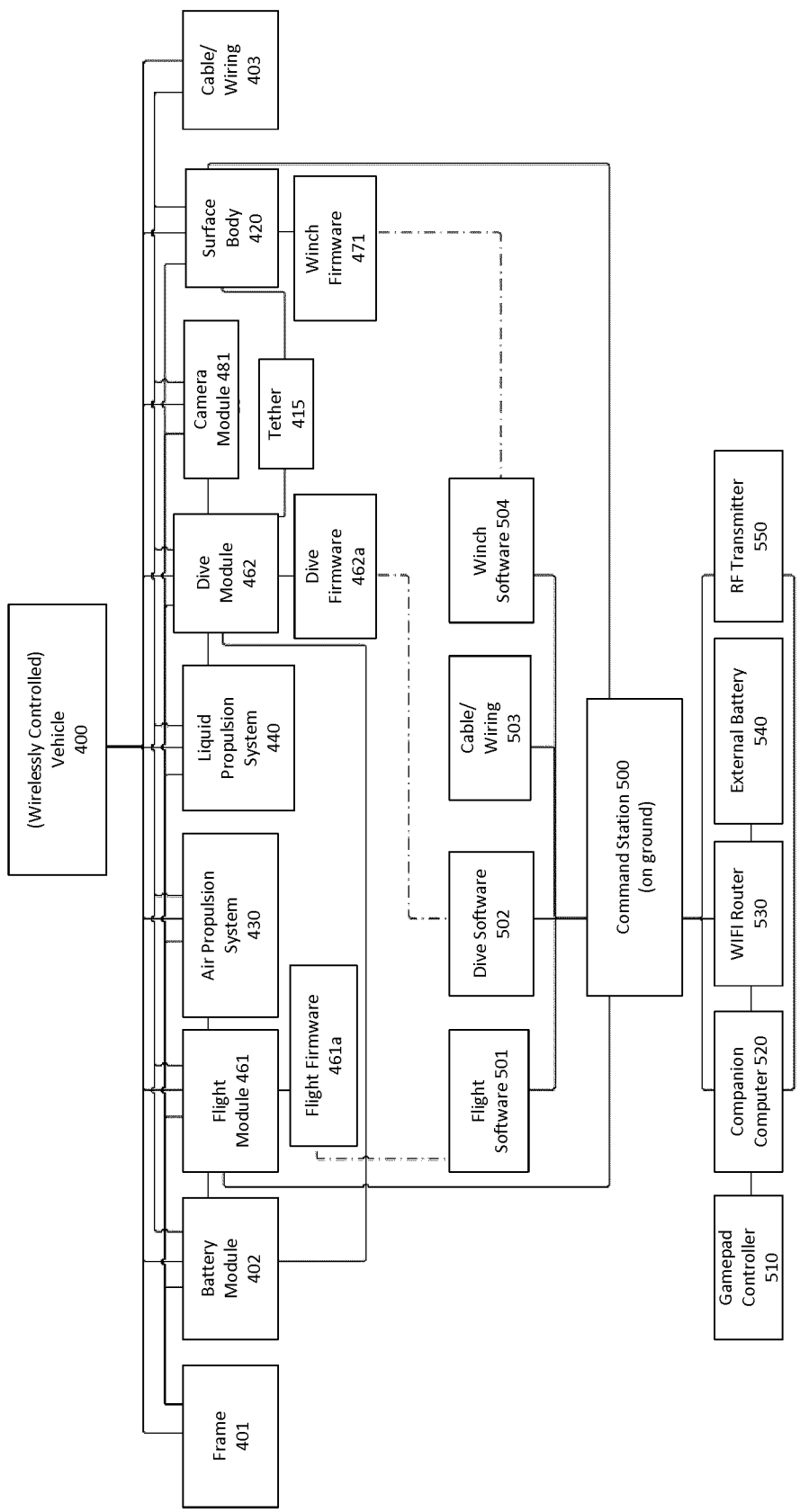
FIG. 4 illustrates a schematic diagram of the structure of a wirelessly controlled vehicle controlled by the command station on ground, in accordance with embodiments of the present invention.

FIG. 4 illustrates a schematic diagram of the structure of a wirelessly controlled vehicle controlled by the command station on ground, in accordance with embodiments of the present invention. According to embodiments, each of the various components of the vehicle 400 may be communicatively and operatively connected and hierarchically structured as illustrated in FIG. 4.

The wirelessly controlled vehicle 400 and the commanding station 500 may be top level components. Each of the top level components may include various second level components. The wirelessly controlled vehicle 400 may include various second level components such as the frame 401, the flight module 461, the air propulsion system 430, the liquid propulsion system 440, the dive module 462, and the surface body 420. The wirelessly controlled vehicle 400 may further include the battery module 402, the camera module 481 and cable/wiring components 403. The commanding station 500 may include various second level components such as the flight software 501, the dive software 502, the cable/wiring 503 and the winch software 504. The second level components of the commanding station 500 may further include the gamepad controller 510, the companion computer 520, the WiFi router 530, the external battery 540 and Radio Frequency (RF) transmitter 550. In addition, the wirelessly controlled vehicle 400 may further include various third level components such as the flight firmware 461a, the dive firmware 462a and winch firmware 471. In some embodiments, at least some components of the vehicle 400 may be operatively connected to each other using the cable/wiring components 403.

According to embodiments, the frame 401 may provide structural integrity for various physical components of the vehicle 400. Each physical component of the vehicle 400 may be at least in part be physically affixed to the frame 401. For example, each set of propelling blades of the air propulsion system 430 may be affixed to the end of frame arms (e.g. longitudinal connecting arms 333) as illustrated in FIGS. 3A to 3C.

According to embodiments, the battery module 402 may be operatively connected to the flight module 461 and the dive module 462. The battery module 402 may directly or indirectly supply (electrical) powers to various components of the vehicle 400. For example, the battery module 402 directly supply power to the flight module 461 and the dive module 462 and indirectly supply power to the air propulsion system 430 and the liquid propulsion system 440 via the flight module 461 and the dive module 462, respectively.

According to embodiments, the flight module 461 may be operatively connected to the air propulsion system 430. The flight module 461 may control the air propulsion system 430 to manage and operate aerial flights or surface travel of the vehicle 400. In order to control the air propulsion system 430, the flight firmware 461a may be installed in the flight module 461. The flight firmware 461a may control the operation of the air propulsion system 430 based at least in part on the operational instructions received from the ground station 500. The flight firmware 461a may be wirelessly communicating with the flight software 501 using wireless signal (e.g. a radio frequency of 900 MHz) to receive operational instructions from the ground station 500. In various embodiments, the flight module 461 may include various components such as flight controller. In various embodiments, the flight firmware 461a may be operating in association with one or more components of the flight module 461. According to embodiments, the flight module 461 may be operatively connected to the commanding station 500.

According to embodiments, the dive module 462 may be operatively connected to the liquid propulsion system 440. The dive module 462 may control the liquid propulsion system 440 to manage and operate surface travel or submergence travel of the vehicle 400. In order to control the liquid propulsion system 440, the dive firmware 462a may be installed in the dive module 462. The dive firmware 462a may control the operation of the liquid propulsion system 440 based at least in part on the operational instructions received from the ground station 500. The dive firmware 462a may be wirelessly communicating with the dive software 502 using wireless signal (e.g. radio frequency of 900 MHz) to receive operational instructions from the ground station 500. In various embodiments, the dive module 462 may include various components such as dive controller, one or more sensors (e.g. depth sensor), computing board (e.g. Raspberry Pi™) and tether interface board (e.g. fathom-X™). In various embodiments, the dive firmware 462a may be operating in association with one or more components of the internal computing system of the dive module 462.

According to embodiments, the dive module 462 may be also operatively connected to the camera module 481. The camera module 481 may be configured to support the submergence travel of the vehicle 400 by providing various data (e.g. video data). For example, the camera module 481 may provide visions (e.g. by streaming video data) to the user especially when the vehicle 400 is travelling under the liquid. The camera module 481 may transmit such data to the dive module 462.

According to embodiments, the dive module 462 may be communicatively and operatively connected to the surface body 420. The surface body 420 may include the winch (not shown in the figure) configured to spool and unspool the tether 415 operatively connecting the dive module 462 and the surface body 420. In order to control the winch, the winch firmware 471 may be installed in the winch. The winch firmware 471 may control the operation of the winch based at least in part on the operational instructions received from the ground station 500. The winch firmware 471 may be wirelessly communicating with the winch software 504 using wireless signal (e.g. WiFi 2.4 GHz signal) to receive operational instructions from the ground station 500.

According to embodiments, the commanding station 500 may include a number of components such as the flight software 501, the dive software 502, the cable/wiring 503 and the winch software 504, the gamepad controller 510, the companion computer 520, the WiFi router 530, the external battery 540 and Radio Frequency (RF) transmitter 550, as illustrated above. In some embodiments, at least some components of the commanding station 500 may be operatively connected to each other using the cable/wiring components 503.

According to embodiments, the commanding station 500 may operatively connected one or more components of the wirelessly controlled vehicle 400. Using such connections, the wirelessly controlled vehicle 400 may be at least in part controlled by the commanding station 500 that is remotely located on ground.

According to embodiments, the user may directly enter the operational instructions or commands to the ground station 500 using the gamepad controller 510. The gamepad controller 510 may transmit the operational instruction entered by the user to the companion computer 520. The companion computer 520 may process the user commands so that the firmware of the wirelessly controlled vehicle 400 can process the operational instructions from the ground station 500. When processing the operational instructions, the companion computer 520 may run one or more of the flight software 501, the dive software 502 and the winch software 504, depending on the type of the operational instruction to process. Once processed, the flight software 501, the dive software 502 and the winch software 504 may transmit the instructions to the flight firmware 461a, the dive firmware 462a and the winch firmware 471 using the WIFI router 530 or the RF transmitter 550.

According to embodiments, the external battery 540 (e.g. 12V Lipo) may be operatively connected to the companion computer 520 or the WiFi router 530 to provide (e.g. electrical) power.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A wirelessly controlled vehicle configured for air travel and submerged travel, the vehicle comprising:
    a submerging body;
    a surface body configured to be coupled to the submerging body during air travel and decoupled from the submerging body during submerged travel, the surface body configured to at least in part float during submerged travel and the surface body configured to wirelessly receive operational instructions during submerged travel;
    an air propulsion system operatively coupled to one or more of the submerging body and the surface body;
    a liquid propulsion system operatively coupled to the submerging body; and
    a tether communicatively connecting the submerging body and the surface body, the tether configured to transfer data indicative of the operational instructions between the submerging body and the surface body.

2. The vehicle according to claim 1, wherein the surface body is configured to wirelessly receive air operational instructions during air travel.

3. The vehicle according to claim 1, wherein the submerging body is configured to wirelessly receive air operational instructions during air travel.

4. The vehicle according to claim 1, wherein the vehicle is configured for travel on surface of liquid.

5. The vehicle according to claim 1, wherein the vehicle is configured for maintaining its position while the vehicle is floating in air, lying on surface of liquid or submerged under liquid.

6. The vehicle according to claim 1, further comprising a submergence system operatively coupled to the submerging body.

7. The vehicle according to claim 1, further comprising a communication system operatively coupled to the surface body.

8. The vehicle according to claim 1, further comprising a navigation system operatively coupled to the surface body.

9. The vehicle according to claim 1, further comprising a winch operatively coupled to the surface body, the winch is configured to spool or unspool the tether.

10. A wirelessly controlled vehicle configured for air travel and submerged travel, the vehicle comprising:
    a submerging body;
    a surface body configured to be coupled to the submerging body during air travel and decoupled from the submerging body during submerged travel, the surface body configured to at least in part float during submerged travel and the surface body configured to wirelessly receive operational instructions during submerged travel;
    a propulsion system operatively coupled to the submerging body; and
    a tether communicatively connecting the submerging body and the surface body, the tether configured to transfer data indicative of the operational instructions between the submerging body and the surface body.

11. The vehicle according to claim 10, wherein the propulsion system is a liquid propulsion system, the vehicle further comprising an air propulsion system coupled to one or more of the submerging body and the surface body.

12. A wirelessly controlled vehicle configured for air travel and submerged travel, the vehicle comprising:
    a submerging body;
    a surface body configured to be coupled to the submerging body during air travel and decoupled from the submerging body during submerged travel, the surface body configured to at least in part float during submerged travel and the surface body configured to wirelessly receive operational instructions during submerged travel;
    an air propulsion system operatively coupled to one or more of the submerging body and the surface body;
    a liquid propulsion system operatively coupled to the submerging body; and
    a communication system communicatively connecting the submerging body and the surface body, the communication system configured to transfer data indicative of the operational instructions between the submerging body and the surface body.

13. The wirelessly controlled vehicle according to claim 12, wherein the communication system is a wireless communication system.

14. The wirelessly controlled vehicle according to claim 12, wherein the communication system is associated with a tether connecting the surface body and the submerging body.

* * * * *